United States Patent
Tsang

(10) Patent No.: US 7,413,582 B2
(45) Date of Patent: Aug. 19, 2008

(54) LITHIUM BATTERY

(76) Inventor: Floris Y. Tsang, 342 Mangrove Way, Walnut Creek, CA (US) 94598

( * ) Notice: Subject to any disclaimer, the term of this patent is extended or adjusted under 35 U.S.C. 154(b) by 0 days.

(21) Appl. No.: 11/512,610

(22) Filed: Aug. 29, 2006

(65) Prior Publication Data

US 2007/0048610 A1  Mar. 1, 2007

Related U.S. Application Data

(60) Provisional application No. 60/711,816, filed on Aug. 29, 2005.

(51) Int. Cl.
*H01M 4/38* (2006.01)
*H01M 4/40* (2006.01)
*H01M 6/18* (2006.01)

(52) U.S. Cl. .............. 29/623.1; 429/218.1; 429/231.95; 429/322

(58) Field of Classification Search .............. None
See application file for complete search history.

(56) References Cited

U.S. PATENT DOCUMENTS 3,953,230 A * 4/1976 Farrington et al. .......... 429/320
4,826,743 A * 5/1989 Nazri .......................... 429/322

OTHER PUBLICATIONS

Certified translation of Prishyazhnyy, et al article titled "Synthesis and Properties of Black Phosphorus," 1997 (no month).*
Prisyazhnii, V. D.; Synthesis and Properties of Black Phosphorus, Dopovidi Natsional'noi Akademii Nauk Ukraini, Iss. 3, 1997, p. 154.

* cited by examiner

*Primary Examiner*—Jonathan Crepeau
(74) *Attorney, Agent, or Firm*—Schein & Cai LLP; Douglas E. Mackenzie; Jingming Cai

(57) ABSTRACT

A solid-state lithium battery including a lithium-containing anode and a phosphorus-containing cathode is disclosed. The cathode may include any of a number of electronically conductive allotropes of phosphorus, referred to as a group as black phosphorus. A solid discharge product of the cell acts as an electrolyte for the cell. The cathode may include an auxiliary electronic conductor phase to improve the conductivity of the cathode, improve the cathode utilization during discharge and reduce the overall cell impedance.

3 Claims, 1 Drawing Sheet

LITHIUM BATTERY

RELATED APPLICATIONS

This patent claims the benefit of Provisional Patent Application Ser. No. 60/711,816, filed Aug. 29, 2005, the disclosure of which is herein incorporated by reference in its entirety.

FEDERALLY SPONSORED RESEARCH

Not Applicable

SEQUENCE LISTING OR PROGRAM

Not Applicable

FIELD OF THE INVENTION

The present invention relates to a lithium battery suitable for providing power for electronic devices. In particular the invention relates to a lithium battery composition, its method of operation, and its method of assembly.

BACKGROUND OF THE INVENTION

Cells and batteries based on lithium metal come in many different forms and are used to power a wide range of electronic devices and instruments. Their distinguishing feature is the use of lithium metal (or a lithium metal alloy) as the anode. Like other electrochemical cells they require a counter electrode or cathode and a lithium-ion conducting electrolyte joining the two electrodes. The anode and counter electrode must also be electronically separated. Since most lithium cell electrolytes are liquid, this is usually accomplished through the use of an insulating porous film impregnated with the electrolyte, sandwiched between the two electrodes.

A wide range of cathode materials have been used or proposed for use in cells of this configuration. Some desirable properties for cathode materials include high voltage, high energy density, compatibility with the electrolyte, and high conductivity when utilized in a cell.

Some examples of commercial lithium metal batteries with liquid electrolytes and porous separators include lithium/carbon monofluoride, lithium/iron disulfide, lithium/manganese dioxide and lithium/silver vanadium oxide. These cells operate well at room temperature with relatively high power and energy density. Other cathode materials have been proposed. Of particular relevance to this invention, a liquid electrolyte cell with a porous polymer separator in this classic configuration has been reported in the journal *Dopovidi Natsional'noi Akademii Nauk Ukraini*, 1997, 3, p. 154 utilizing a lithium anode and a cathode containing black phosphorus.

A number of lithium cells have been developed that utilize a solid electrolyte, which can function both as the separator and the electrolyte. Solid electrolytes for lithium cells must be both lithium ion conducting and electronically insulating. There have been a wide range of solid state materials identified over the years as suitable for use as electrolytes for lithium cells including lithium iodide, lithium phosphide, LiPON and LiSiCON. Most of these materials are glassy in nature and their lithium ion conductivities can vary greatly based on their form, specific composition and temperature of operation. Other solid electrolytes include polyethylene oxide/lithium salt composites and solid polymer gel electrolytes. The solid electrolyte material can be applied as a thin layer between the anode and cathode and if necessary mixed with the active anode and cathode materials within the electrodes. Some examples of cathode materials used or proposed for use in such cells include sulfur, iodine, and lithium transition metal oxides such lithium vanadium oxide, lithium iron phosphate, and lithium cobalt oxide. Cells made with solid electrolytes often have advantages in terms of storage stability, energy density, ease of manufacture, wide temperatures of operation and resistance to shock and vibration.

Within this class of solid-state cells and batteries, the lithium/iodine cell is unique in that the reaction between the anode and cathode itself generates the solid electrolyte phase, lithium iodide (LiI). Since the solid electrolyte phase is generated in-situ, there is no need to apply a solid electrolyte film to either the anode or cathode prior to cell assembly leading to advantages in energy density, manufacturability and life. Such a process also prevents shorting of the cell via self-healing, making them highly reliable and safe. The electrolyte propagates through the active materials as the cell is discharged and more reaction product or electrolyte is formed. Thus, as the anode and cathode are consumed by the discharge reaction, the electrolyte formed occupies the space, keeping the two electrodes in ionic contact. The theoretical energy density of the lithium/iodine couple is ~1.9 $Wh/cm^3$ with current practical values approaching 1 $Wh/cm^3$. Such cells are described in U.S. Pat. Nos. 3,660,163; 3,674,562; 4,148,975 and 4,952,469.

Due to their reliability and long life, these cells are widely used to power cardiac pacemakers and have been used for solid-state memory power, digital watches and sensors and monitoring equipment. While the voltage of operation is high (~2.8 V) lithium/iodine cells operate at very low power and high impedance, due to the low ionic conductivity of the electrolyte (~$10^{-7}$/Ohm-cm) and the low electronic conductivity of the iodine. Methods of reducing the high impedance of the iodine cathode have been developed and most commercial cells currently utilize a pyridine-containing polymer (P2VP) as a depolarizer to increase the conductivity of the solid iodine phase. Such approaches lead to a decrease in the percentage of active material in the cell and thus a decrease in overall energy density. However, the advantages of the self-forming electrolyte and relative high capacity have led to widespread use in commercial devices.

Accordingly, a new solid-state cell with a self-forming electrolyte that exhibits greater energy density and higher power would be highly desirable.

SUMMARY OF THE INVENTION

In one aspect, the present invention relates to the composition of a new solid-state lithium battery comprising a lithium-containing anode, preferably lithium metal, and a phosphorus-containing cathode. In particular, the cathode may comprise any of a number of electronically conductive allotropes of phosphorus, herein referred to as a group as black phosphorus. Unlike the more common yellow or red allotropies, black phosphorus is electronically conductive allowing for ongoing reductive chemical reaction with lithium during cell discharge. At least one form of conductive black phosphorus has a graphite-like structure and is the thermodynamically stable form of phosphorus.

In one aspect of this invention, the black phosphorus electrode may contain an electronically conductive phase to further enhance the conductivity of the cathode electrode and reduce the cathode impedance.

In another aspect of this invention the electronically conductive phase is rendered non-conductive with cell discharge.

In a preferred embodiment of the invention, the cell discharge reaction converts an electronically conductive cathode, black phosphorus, to a lithium-ion conducting electrolyte, lithium phosphide, effectively propagating the electrolyte and electrochemical reaction-front toward the cathode. At any one stage during discharge the cell composition includes, but is not limited to, a lithium anode, a black phosphorus based cathode and an in-situ formed solid electrolyte/separator formed from the reaction product of lithium and black phosphorus.

In another aspect of the invention, a cell structure and method of assembly for the solid-state lithium/black phosphorus cell is provided wherein the lithium based anode and the black phosphorus based cathode are brought into direct contact during assembly. A thin lithium phosphide layer may form instantaneously at the interface of the two electrodes, electrochemically via an initial internal "short". The in-situ formation of the electrolyte layer at the interface is self-limiting since the formed layer is electronically insulating. Thus the cell can be assembled without a pre-existing separator or electrolyte phase. Subsequent discharge of the cell through an external circuit will propagate the solid lithium phosphide electrolyte while maintaining electronic separation of the anode and cathode. Such a cell is not susceptible to failure from the formation of shorts and is thus highly reliable.

In another aspect of the invention an initial lithium ion-conducting layer is pre-applied to the anode, cathode or both electrodes before assembly of the cell.

In yet another aspect of this invention a lithium/phosphorus battery constructed with a conventional bipolar configuration is provided, wherein multiple layers of the anode and cathode electrodes are stacked in series to create a high voltage battery.

Additional advantages of the invention will become readily apparent to those skilled in the art from the following detailed description, wherein only the preferred embodiments of the invention are shown and described, simply by way of illustration of the best mode contemplated for carrying out the invention. As will be realized, the invention is capable of other and different embodiments, and its details are capable of modifications in various obvious respects, all without departing from the invention. Accordingly, the drawings and description are to be regarded as illustrative in nature and not as restrictive.

DETAILED DESCRIPTION OF THE INVENTION

Figure 1:
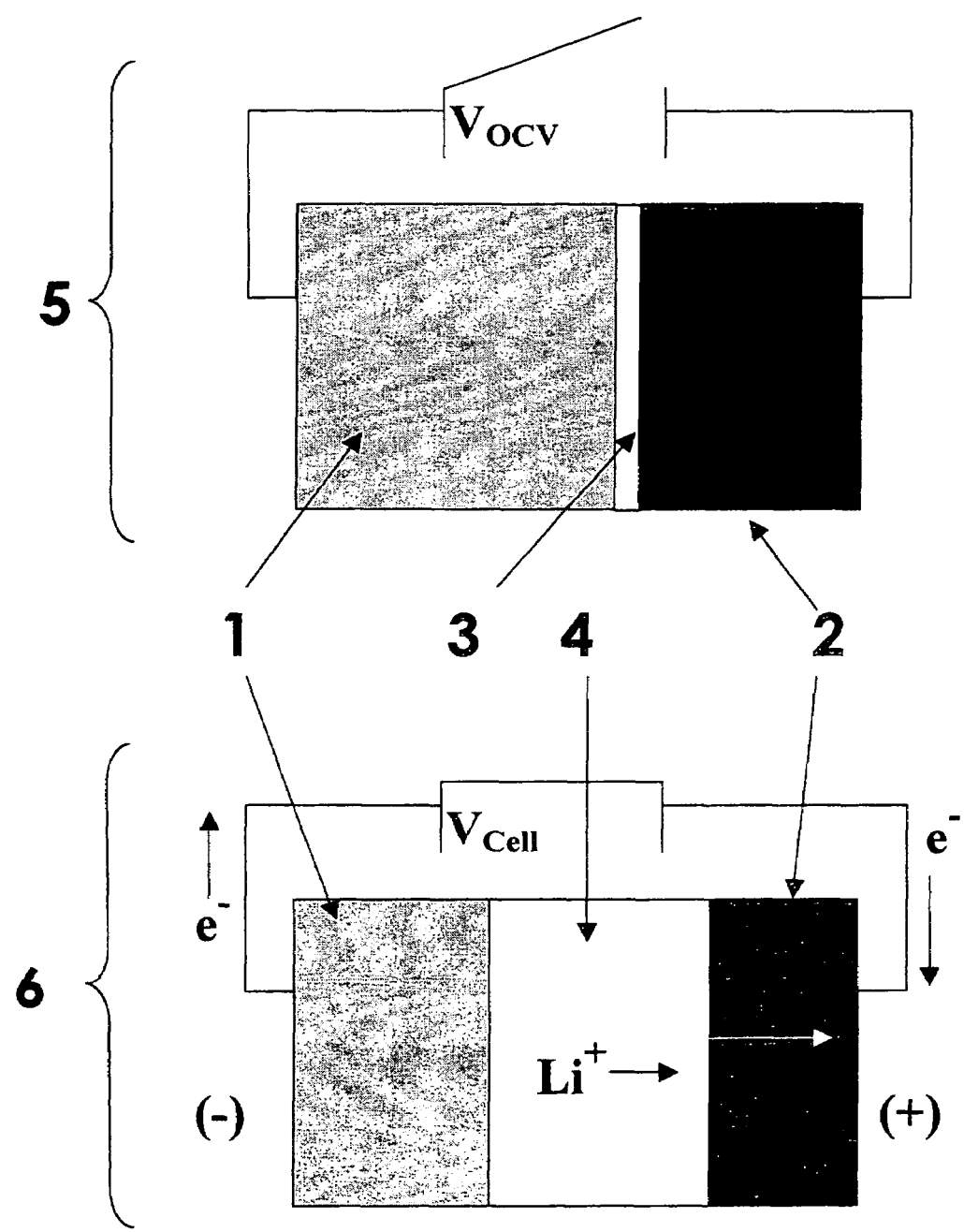
FIG. 1 is a schematic illustration of a solid-state lithium anode/black phosphorus cathode cell after initial assembly and during discharge in accordance with the invention.

The solid-state electrochemical cell of this invention comprises a lithium based anode electrode and a cathode electrode containing an electronically conductive allotrope of phosphorus. While there are a number of conductive forms of phosphorus that have been reported, each with slightly different properties, we will refer to them as a group herein as black phosphorus. The reaction between lithium and black phosphorus can produce lithium phosphide, a well-known Li-ion conductor, some forms of which have demonstrated very high ionic conductivity ($\sim 10^{-3}$/Ohm-cm).

FIG. 1. illustrates one embodiment of a cell of this invention wherein the cell is shown both immediately after assembly 5 and during discharge 6. In this embodiment, a lithium metal anode electrode 1 is placed in contact with a black phosphorus cathode electrode 2, immediately resulting in the formation of a lithium phosphide layer 3 at the interface due to the reaction of the lithium anode 1 and the phosphorus cathode 2. The in-situ formed, insulating lithium phosphide layer 3 may act as both the separator and the electrolyte for the cell, first preventing further chemical reaction or shorting of the lithium and phosphorus electrodes 1 and 2 because it is an insulating layer, and second keeping the anode and cathode 1 and 2 in electrochemical contact because it is a lithium ion conductive material.

Such a cell is highly stable and is not susceptible to damage from internal cell shorts because they will be self-limiting as the short is isolated by the formation of insulating lithium phosphide. In many lithium battery systems without such a self-healing mechanism, shorting of the anode and cathode can result in catastrophic failure of the cell with the potential for cell rupture, fire or explosions.

Once assembled, the cell may be discharged through an external circuit. During discharge 6 the electrons flow from the negative anode electrode 1 to the positive cathode electrode 2 to reduce the phosphorus material of the cathode 2. Concurrently, lithium ions migrate from the lithium anode 1, through the existing lithium phosphide ion conductive layer 4 towards the cathode electrode 2 where they react with the phosphorus present at the lithium phosphide layer/phosphorus layer interface to form more lithium phosphide. Thus the lithium phosphide layer 4 self-propagates in the direction of the cathode 2 as the cell is discharged, continuing to act as the cell electrolyte and separator by maintaining electrochemical contact between the anode and cathode 1 and 2 and allowing for ongoing electrochemical reaction. Opening the circuit will stop electron flow and will prevent further reaction of the lithium and phosphorus in the cell. Thus the cell can be used to power electronic devices.

In one aspect of the invention, the structure and assembly of the cell is similar to that known for a lithium iodine cell, which can also be assembled without a preexisting separator or electrolyte. In the case of a lithium iodine cell the lithium anode reacts with the iodine cathode to form a lithium ion conducting, lithium iodide layer between the anode and cathode. As the cell is discharged the lithium iodide layer grows, maintaining electrochemical contact between the anode and cathode. However, the lithium phosphorus cell of this invention has certain advantages over a comparable lithium iodine cell. For example, the in-situ formed lithium phosphide electrolyte may have a much higher lithium ion conductivity than a lithium iodide electrolyte. Also, the theoretical capacity and energy density of a cell based on the formation of lithium phosphide from lithium and phosphorus can be much greater than that for the formation of lithium iodide from lithium and iodine. Furthermore, the inherent electronic conductivity of iodine is very low unless a conductive adduct is formed with the iodine phase prior to cell assembly, typically utilizing a pyridine-containing polymer. The addition of the essentially inactive polymer phase effectively reduces the theoretical capacity of the cell whereas the black phosphorus active material is inherently electronically conductive.

Black phosphorus material for use as the cathode may be produced by any number of methods. Some examples include high-pressure and temperature conversion of other non-conductive allotropes of phosphorus to black phosphorus, precipitation of black phosphorus from bismuth melts containing yellow phosphorus, and mercury catalyzed formation of black phosphorus from yellow phosphorus seeded with black phosphorus. Properties such as structure, crystallinity, morphology, purity and conductivity of black phosphorus materials made by different methods may vary and thus may affect the overall performance of the cell of this invention. Thus the synthesis of the cathode material may be modified to produce the black phosphorus material with the most ideal characteristics for a specified cell application. For example, the desirable properties of the black phosphorus cathode material may be high conductivity, high crystallinity and high purity to maximize the overall energy density of the cell whereas other properties may be critical to maximize the overall power capability of the cell. The black phosphorus material may be collected as a powder or as a solid monolith or as a thin film after synthesis.

In one embodiment of this invention, the black phosphorus cathode may be a dense, substantially single-phase monolith. In another embodiment of this invention the cathode may comprise black phosphorus and an auxiliary electronic conductor phase to improve the conductivity of the cathode, improve the cathode utilization during discharge or to reduce the overall cell impedance. The electronic conductor phase may be selected from any number of conductive materials such as, but not limited to, carbon, metals or metal alloys, or polymeric materials, which may take the form of powders, fibers, films or continuous arrays. The auxiliary electronic conductor phase may be mixed with or applied to the black phosphorus phase prior to cell assembly. The composite may be pressed into a pellet, coated onto a conductive substrate or otherwise deposited into the cell.

In another embodiment of this invention, the discharge product of a black phosphorus cathode containing an auxiliary conductive phase is substantially electronically non-conductive. In certain embodiments of the cell this may be necessary to prevent the formation of a continuous electronically conductive path connecting the lithium anode to the current collector of the cathode through the electronically conductive phase, resulting in a permanently shorted cell. The discharge product between lithium and the composite black phosphorus/electronically conductive phase cathode may be rendered electronically non-conductive by a number of mechanisms including, but not limited to, effectively breaking the conductive path through the volumetric expansion of the phosphorus cathode upon formation of the lithium phosphide product. In a preferred embodiment of this invention the lithium anode may be lithium metal.

In another aspect of this invention, a method of assembling the cell is provided. In one embodiment the lithium phosphorus cell is assembled without a preexisting separator or electrolyte by placing the lithium anode and phosphorus cathode in contact with each other to form a lithium phosphide layer in-situ that effectively separates the anode and cathode. The anode is connected electronically to the negative side of the cell container (negative terminal) and the cathode is connected electronically to the positive side of the cell container (positive terminal). The two terminals of the cell container are electronically isolated from each other. The anode and cathode material may be connected to the negative and positive terminals physically by applying pressure, or they may be coated onto a current collector that is electronically welded or otherwise electronically attached to their respective terminals.

In another embodiment of this invention, the cell is assembled with a pre-existing ion-conductive interfacial layer sandwiched between the anode and cathode. The pre-existing ion conductive layer will act as the initial separator and electrolyte and may impart improved interfacial properties to the electrodes, improved contact between the electrodes when assembled, and improved cell performance. The pre-existing layer may be applied to the lithium anode electrode surface, to the phosphorus cathode electrode surface or to both prior to cell assembly. The pre-existing ion conductive interfacial layer may be selected from a number of materials including, but not limited to, the glassy ceramic materials such as LiPON and LiSICON, or the materials $Li_3N$, $Li_3P$, $Li_2O$, LiI, polyethylene oxide/lithium salt, or a solid polymer gel electrolyte.

The cell of this invention may be encased in a sealed container suitable for electrochemical cells, wherein the positive cathode side and negative anode side are electrically insulated from each other. In one embodiment of this invention a battery with a bipolar configuration may be assembled using stacks of electrodes to provide higher voltages and greater power. The cell of this invention is suitable for use as a power source for electronic devices, instruments and sensors, and may range in size from very large (>2 Ah) to very small size micro-batteries.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of assembling a solid-state electrochemical cell comprising the step of:
   placing a lithium anode and a phosphorus cathode in contact with each other without a pre-existing separator or electrolyte to form a lithium phosphide layer in-situ.

2. The method of claim 1, further comprising connecting the anode electronically to a negative side of a cell container and connecting the cathode electronically to a positive side of the cell container.

3. The method of claim 1, wherein the anode comprises lithium metal and the cathode comprises black phosphorus.

\* \* \* \* \*